United States Patent [19]

Haley et al.

[11] 4,242,928

[45] Jan. 6, 1981

[54] FILING AID

[76] Inventors: Belle J. Haley; Robert D. Haley, both of 2525 Robb Ct., Lakewood, Colo. 80215

[21] Appl. No.: 38,911

[22] Filed: May 14, 1979

[51] Int. Cl.[3] .......... B25B 9/02; B65G 7/12

[52] U.S. Cl. .......... 81/3 R; 294/26

[58] Field of Search .......... 81/3 R; 294/26, 19 R, 294/1 A, 32; 224/45 R, 45 T, 45 W; 145/61 C

[56] References Cited

U.S. PATENT DOCUMENTS

| | | | |
|---|---|---|---|
| 972,028 | 10/1910 | Schimanski | 81/3 R |
| 1,328,964 | 1/1920 | Penn | 294/26 |
| 1,614,426 | 1/1927 | Rosiers | 81/3 R |
| 2,187,192 | 1/1940 | Albrecht | 145/61 C |
| 3,664,211 | 5/1972 | McConnell | 81/3 R |
| 4,149,743 | 4/1979 | Becnel | 294/26 |

OTHER PUBLICATIONS

IBM Technical Disclosure Bulletin, Burnham, D. W. Retreiving Tool, vol. 17, No. 8, Jan. 1975.

*Primary Examiner*—James G. Smith
*Assistant Examiner*—Roscoe V. Parker
*Attorney, Agent, or Firm*—Richard D. Law

[57] ABSTRACT

An elongated rigid tool having a handle at one end and a file contactor at the opposite end, having a total length greater than the width of the files to be manipulated and thickness permitting easy entry between tightly bunched files and manipulation of the files.

3 Claims, 6 Drawing Figures

FILING AID

This invention relates to an office file manipulating tool, which is thin for placement between files and includes a manipulating handle for turning the tool and a manipulating head for spacing adjacent files.

THE FIELD OF ART

The great amount of paper work connected with business creates problems in storage, retrieval, and general paper management. In most cases, business papers are collected and maintained in a prescribed order in some sort of a file jacket, container, folder or the like. The file jacket is then placed in a file cabinet drawer, of on kind or another. File cabinet drawers have a habit of getting full, making insertion and withdrawal of file jackets difficult. Storage cabinets for files invariably are crammed as full as possible, particularly where the files are little used. File cabinet drawers have, heretofore, been made with dividers in an attempt to prevent crowding of files. The usual situation, however, is that crowding continues.

Removing a file from a jammed full drawer is no easy matter, and to the consternation of secretaries or file clerks, broken finger nails are the norm. Further, the replacing or filing a file into a full drawer is a problem itself.

Its not infrequently occurs that a file jacket is removed from a drawer for a short period, after which it is returned to its place. This requires hunting the repository location of the file jacket and replacing it. Further, several file jackets may be required from the same drawer at the same time, compounding the problem.

The files in drawers, even if not full, many times are difficult to manipulate as withdrawing, moving to find a file, etc. For example, a less than full drawer without a divider permits the file jackets to lie at an angle. It is usually necessary to have a person push a hand behind some files and wiggle the files to get them upright. Again, broken finger nails and paper cuts are common.

THE INVENTION

According to the invention there is provided a filing aid which may be pushed between two file jackets in a drawer and twisted to separate the two adjacent files, and, of course, push the adjacent files apart. The filing aid is a thin profile device for easy insertion between file jackets, and it is longer than the width of the file jackets so as to be visible above the files when pressed between two adjacent jackets. The filing aid has a handle for manipulating the tool and permitting a user to twist the tool to spread the two adjacent tools apart.

OBJECTS AND ADVANTAGES OF THE INVENTION

Included among the objects and advantages of the invention is to provide an easily used filing aid, for separating file jackets, marking locations of files and preventing broken finger nails and paper cuts.

Another object of the invention is to provide a filing aid having a manipulating handle, giving sufficient movement to turn the filing aid from a very thin profile to its width while in between file jackets in a filing receptacle.

Still another object of the invention is to provide a filing aid of very thin profile for insertion between files in a receptacle but with a width to separate adjacent files, by twisting the filing aid, for providing access to the file jackets.

Yet another object of the invention is to provide a filing aid having indica areas arranged to extend above the tops of filing jackets in a receptacle, marking locations in the stack of filing jackets.

These and other objects of the invention may be ascertained by reference to the following description and appended illustrations.

GENERAL DESCRIPTION OF THE DRAWINGS

DETAILED DESCRIPTION OF THE DRAWINGS

Figure 2:
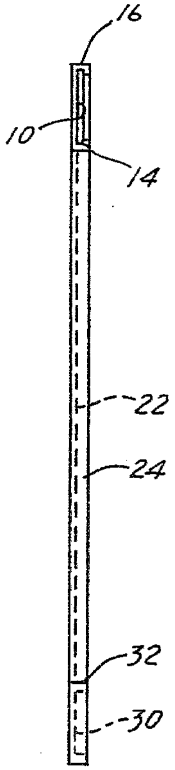
FIG. 2 is a side elevational view of the device of FIG. 1.
Figure 1:
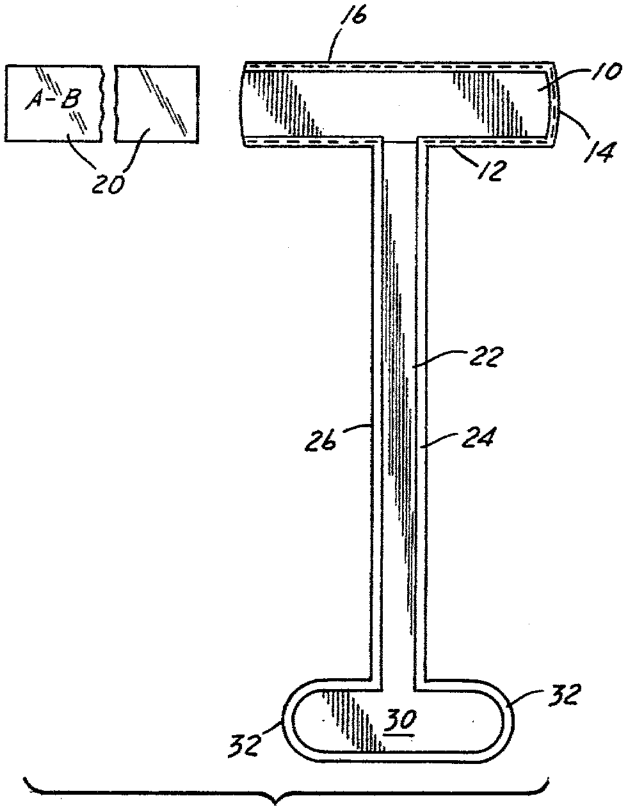
FIG. 1 is a plan view of one form of the filing aid of the invention.

In the modification illustrated in FIGS. 1 and 2, a filing aid is manufactured as a single piece, plastic member including a handle portion 10 which is a thin, planar member having an upstanding rim or edge on three sides for reinforcing. The handle includes a lower edge 12, a side edge 14 and a top edge 16, leaving an open side 18 without the rim portion. The edges of the rim are undercut to accept an indicia card 20 which may be slipped into the handle and retained by the edges. An integral planar shank portion 22 integral with and extending from the handle includes upstanding edges 24 and 26 on each side of the shank portion. A manipulating head 30, with a circumferential rim 32 is integrally joined to the shank, with all three members, i.e. handle, shank and head in the same plane. The thickness of the unit is maintained as slender as possible, keeping sufficient strength to permit substantial twisting, for easy insertion in between file folders or jackets in a file cabinet drawer or the like. The reinforcing rim around the members aids in maintaining thinness of the unit with sufficient strength.

File folders or jackets are usually 9–10 inches wide, in filing condition, so as to fit an 11 inch high drawer. The drawer width may be some 10 inches (letter size) or about 16 inches (legal size), but the drawers for all sizes retain the same height, as the standard width of paper in the United States is 8 ½ inches. The total length of the tool is, therefor, at least about 11 inches, so that the handle extends above the file folders or jackets when pushed completely to the base of the drawer. The handle width is preferably about 4 inches wide for good leverage to twist the filing aid, as explained below. The height of the handle may be 1½ to 2½ inches providing a good hand grip for the user and providing an area for indicia if desired. The shank may be ¾ inch to 2 inches wide, and the head should be 2–4 inches wide.

Figure 4:
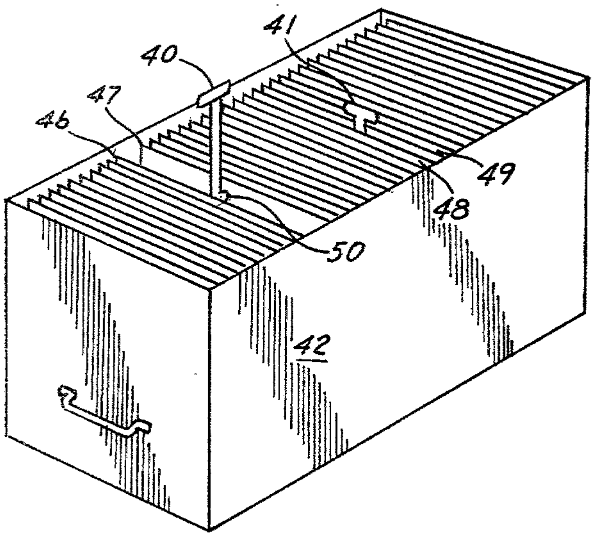
FIG. 4 is a perspective view of several uses of the filing aid of the invention with a filing cabinet drawer.
Figure 5:
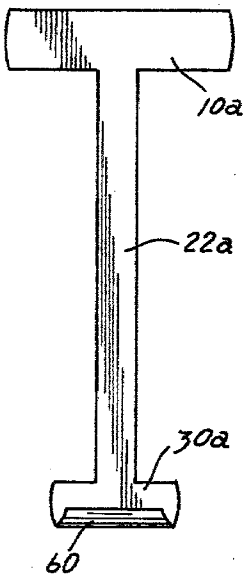
FIG. 5 is a side elevational view of a still further modified filing aid.
Figure 6:
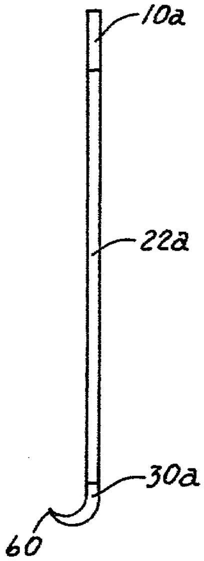
FIG. 6 is a plan view of a device of FIG. 5.

The tool of FIGS. 1 and 2 is preferably made of synthetic plastic, wood, steel, or the like providing sufficient strength for the intended use. As shown in FIG. 4, a filing tool, shown generally by number 40 is positioned between two file folders or jackets 46 and 47, standing upright in drawer 42. The filing tool 40 has been inserted by its narrow thickness between folders 46 and 47 and then twisted so that the head 50 forces the files apart. A filing aid 41 is shown pushed between two folders 48 and 49 so as to rest on the drawer bottom. This leaves the handle extending at least partially above the tops of the folders for identification of locale of a particular folder. When the aid is twisted, as is aid 40, the file folders are spread apart making it easy to grasp a folder for retrieval or for pushing a folder into the drawer.

Figure 3:
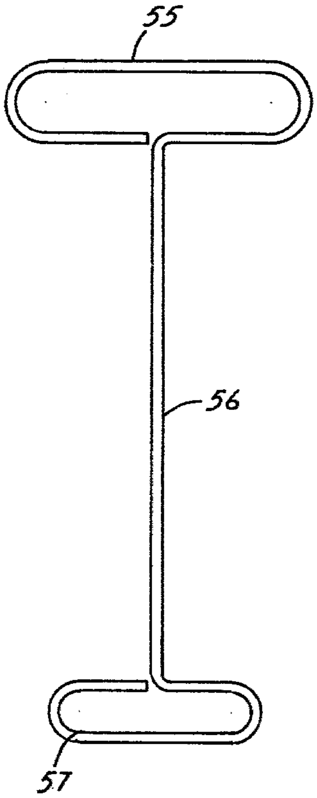
FIG. 3 is a plan view of modified form of filing aid according to the invention.

A modified filing aid is shown in FIG. 3, wherein a heavy, stiff wire is bent to form a flattened loop 55, at one end of the wire a shank portion 56 and a smaller flattened loop 57 at the opposite end of the shank. The loop 55 is preferably 4 inches wide and the loop 47 is 2–4 inches wide the overall length of the unit must be in excess of 10 inches so as to extend above file folders when the aid is pushed to the bottom of the drawer.

In a further modification of the filing aid, a handle portion 10*a*, with or without a reinforcing rim or edge, is integrally secured to shank 22*a*. A manipulating head 30*a* is integrally secured to the shank, and an edge attached lip 60 extends outwardly from the bottom of the head at about 90° from the plane of the head. The extending portion 60 extends from ¼ to ¾ inch from the head so as to slip under the lower edge of a file folder, for lifting the folder out of the drawer. With the head and extending lip, the overall length must exceed the width of the folders to permit manipulation of the head so as to slip the lifting lip under the file folder for lifting.

While the invention has been described in reference to specific embodiments the intent is not to limit the invention to the precise details so set forth, except as defined in the following claims.

What is claimed is:

1. A filing aid for manipulating files in a drawer or cabinet comprising:

(a) a thin, rigid handle means of about 2½ to 4½ inches wide arranged for being grasped and turning the same, (b) a rigid, thin and narrow shank means of substantially the thickness of handle means integrally secured to said handle means and depending therefrom, and (c) a rigid file contacting head means of substantially the thickness of said handle means and of about 2–4 inches wide and the height of said handle means mounted on the end of said narrow shank means on the end opposite said handle means, said handle means, shank means and head means being coplanar and having a thin profile for being pressed between vertically standing files and having a combined length of at least about 11 inches which is greater than the width of the files being manipulated, said head means width of about 2–4 inches being sufficient to separate adjacent files between which said aid is passed, said aid being sufficiently strong and rigid to withstand turning motions by turning said handle.

2. A filing aid according to claim 1, wherein said aid is formed as a one piece rigid synthetic plastic member.

3. A filing aid according to claim 1, wherein said aid is formed of a single strand of stiff wire means bent to form said handle means, said shank means and said head means.

* * * * *